(12) United States Patent
Mills et al.

(10) Patent No.: US 6,831,574 B1
(45) Date of Patent: Dec. 14, 2004

(54) MULTI-TURBO MULTI-USER DETECTOR

(75) Inventors: Diane G. Mills, Wilmington, MA (US); Robert B. MacLeod, Nashua, NH (US); Thomas P. McElwain, Merrimack, NH (US); Dianne E. Egnor, Nashua, NH (US)

(73) Assignee: BAE Systems Information and Electronic Systems Integration INC, Nashua, NH (US)

( * ) Notice: Subject to any disclaimer, the term of this patent is extended or adjusted under 35 U.S.C. 154(b) by 0 days.

(21) Appl. No.: 10/678,203

(22) Filed: Oct. 3, 2003

(51) Int. Cl.$^7$ .............................................. H03M 7/00
(52) U.S. Cl. ......................... 341/50; 714/786; 714/752
(58) Field of Search ........................... 341/50, 51, 94, 341/86, 81; 714/786, 746, 755, 752, 791

(56) References Cited

U.S. PATENT DOCUMENTS

| | | |
|---|---|---|
| 6,028,897 A * | 2/2000 | Wang ......................... 375/265 |
| 6,029,264 A | 2/2000 | Kobayashi et al. |
| 6,166,667 A | 12/2000 | Park |
| 6,298,461 B1 | 10/2001 | Tong et al. |
| 6,430,722 B1 | 8/2002 | Eroz et al. |
| 6,499,128 B1 | 12/2002 | Gerlach et al. |
| 6,510,536 B1 | 1/2003 | Crozier et al. |
| 6,529,559 B2 | 3/2003 | Reshef |
| 2001/0021233 A1 | 9/2001 | Jin |
| 2001/0025358 A1 | 9/2001 | Eidson |
| 2002/0007474 A1 * | 1/2002 | Fujita et al. ................. 714/755 |
| 2003/0026357 A1 * | 2/2003 | Bartlett et al. .............. 375/324 |
| 2003/0028843 A1 * | 2/2003 | Chang et al. ................ 714/786 |
| 2003/0138065 A1 * | 7/2003 | Mills et al. .................. 375/346 |

OTHER PUBLICATIONS

Reed, Mark C et al., Reduced Complexity Iterative Multi–User Detection for DS/CDMA with FEC, IEEE 1997, pp. 10–14.
Reed, Mark C. et al., Near Single User Performance using Iterative Multi–User Detection for CDMA with Turbo–Code Decoders, IEEE 1997 pp. 740–744.
Forney, David G., Jr., Concatenated Codes, Technical Report, Dec. 1, 1965, 115 pp. total.
Robertson, Patrick, A et al., Comparison of Optimal and Sub–Optimal MAP Decoding Algorithms Operating in the Log Domain, IEEE 1995, pp. 1009–1013.
Hagenauer, Joachim et al., A Viterbi Algorithm with Soft–Decision Outputs and its Applications, IEEE 1989 pp. 1680–1686.
Pottie, Gregory J. et al., A Comparison of Reduced Complexity Decoding Algorithms for Trellis Codes, IEEE 1989, pp. 1369–1380.

(List continued on next page.)

Primary Examiner—Brian Young
Assistant Examiner—John B Nguyen
(74) Attorney, Agent, or Firm—Maine & Asmus

(57) ABSTRACT

A Turbo multi-user detector (MUD) processing system in multiple access communications channels that decreases the likelihood of improper decoding of the final values of interest, thereby allowing for a reduction in the number of iterations performed and lowers complexity without negatively impacting performance. The present invention comprises a multi-user detector serially concatenated to two decoder sections in such a manner that data flows iteratively from the MUD and to each detector stage and back to the MUD to correct for errors.

23 Claims, 7 Drawing Sheets

OTHER PUBLICATIONS

Berrou, Claude et al., Near Shannon Limit Error–Correcting Coding and Decoding: Turbo–Codes (1), IEEE 1993, pp. 1064–1070.

Berrou, Claude et al., Near Optimum Error Correcting Coding and Decoding: Turbo–Codes, IEEE 1996, 11 pages.

Wang, Duanyi et al., Low–Complexity MAP Decoding for Turbo Codes, IEEE 2000, pp. 1035–1039.

Benedetto, Sergio et al., Analysis, Design, and Iterative Decoding of Double Serially Concatenated Codes with Interleavers, IEEE Journal on Selected Ares in Communications, vol. 16 No. 2, Feb. 1998, pp. 231–244.

Jin, Hui et al., Coding Theorems for Turbo Code Ensembles* Was to be submitted to IEEE Trans. Inform. Theory, draft of Jan. 11, 2001, pp. 1–25.

Moher, Michael, An Iterative Multiuser Decoder for Near–Capacity Communications, IEEE Transactions on Communications vol. 46, No. 7 Jul. 1998, pp. 870–880.

Alexander, Paul D. et al., Iterative Multiuser Interface Reduction: Turbo CDMA, IEEE Transactions on Communications vol. 47 No 7, Jul. 1999, pp. 1008–1014.

POOR H. Vincent, Turbo Multiuser Detection: An Overview, IEEE 6th Int. Symp on Spread–Spectrum Tech. & Appli., NJIT New Jersey, USA Sept 6–8, pp. 583–587, No Year.

Wang, Xiaodong, et al. Iterative (Turbo) Soft Interference Cancellation and Decoding for Coded CDMA, IEEE 1999, pp. 1046–1061.

Das, Sunman et al., Computationally Efficient Iterative Multiuser Detection and Decoding, Department of Electrical and Computer Engineering, Rice University, 5 pages, No Date.

Herzog, Rupert et al., Iterative Decoding and Despreading improves CDMA–Systems using M–ary Othogonal Modulation and FEC IEEE 1997 pp. 909–913.

* cited by examiner

MULTI-TURBO MULTI-USER DETECTOR

FIELD OF THE INVENTION

This present invention relates to decoding and more particularly to an efficient scheme for decoding in multiple access communications channels.

BACKGROUND OF THE INVENTION

The explosive growth in the demand for wireless communications has been a phenomenal and worldwide event. There are already over 500 million users that subscribe to cellular telephone services and the number is increasing exponentially. The advantages of wireless tools are obvious, and the number of cellular subscribers will soon exceed the number of fixed line telephone installations. Cellular usage is beginning to become the primary phone option, and as more and more content and wireless tools become available, the increase will continue to expand and proliferate across the globe.

In addition to the explosion of cellular usage, there are other wireless implementations such as Internet access, messaging, paging, wireless local area networks (WLANs). With respect to cellular services, the vast majority of users currently subscribe to digital cellular networks, and the typical state of the art cellular handset is based on digital technology such as GSM, TDMA (IS-136) or CDMA (IS-95), although the legacy analog systems using protocols AMPS and TACS are still in operation.

New, emerging receiver processing procedures allow for huge increases in the utilization of multiple access communications, especially in the wireless sector. The tremendous growth and for wireless cellular phones, wireless personal digital assistants (PDA's), laptops and mobile tablets demonstrates the huge volume of traffic and the varying content desired by the public. There are a number of protocols established to define the bandwidth characteristics, including 3G, IEEE 802.11, and Bluetooth, however the number of users and devices requires more users than available bandwidth. The ability to access data and communicate anywhere at anytime has enormous potential and commercial value.

The content of the wireless sector is also changing, with more and more data being transmitted, including Internet connectivity and live feeds. The usage involving personal digital assistants (PDA's) and even smart appliances have created new markets utilizing wireless data communications. And, this wireless phenomenon is not limited to any geographical boundaries, as the growth is occurring around the globe.

Thus, despite the advancements in wireless transmission and reception, there is a growing problem of extracting more information signals within a limited bandwidth. Emerging multiple-access receiver processing procedures allow for multiple users to access the same communications medium to transmit or receive information. In addition to the problems associated with multiple users in a given bandwidth, an additional problem is the inability to process the data in the receivers in real time. Advanced receiver techniques cover several areas, namely interference suppression (also called multi-user detection), multipath combining and space-time processing, equalization, and channel estimation. These various techniques can be mixed and matched depending upon the circumstances. Proper signal processing of transmitter and receiver yield a far greater potential than current systems.

While the discussion herein illustrates wireless communications, the multiple access topology is equally applicable to wired cable systems and local area networks, read/write operations of a disc drive, satellite communications and any application that benefits from processing of digital data from among many multiple sources. The use of the term 'users' is therefore utilized as a convention to describe processing among a plurality of signal sources.

The entire field of digital communications encompasses some sophisticated processing and is deployed in a wide range of applications and electronics. Digital communication techniques are now used for communication of combined audio and video telephony. Communication networking also has exploded as affordable connectivity with greater bandwidth has become available via WiFi, satellite, modulated communications over power lines, cable connections, telephone connections and various hybrid systems.

Regardless of the manner in which the communications are delivered, reliable communications are essential. The quality of the communications depends upon the accuracy with which the transmitted signals match the received signals. While some forms of communications, such as audio, can withstand significant bit loss, digital data communications require greater fidelity in order to be successfully processed. Error control coding is used to provide the required fidelity in the presence of channel noise without increasing the power of the transmitted signal.

Terrestrial and satellite radio systems operate over RF propagation channels that induce signal waveform and spectrum distortions, including signal attenuation and multi-path fading. These applications generally use a Forward error correction (FEC) and are designed according to factors such as modulation formats, error control schemes, demodulation and decoding techniques and hardware components to optimize system performance and implementation complexity. Advanced techniques such as multi-user detection and error correction are also used in applications other than wireless communications and data networking systems. For example, the storage and subsequent retrieval of stored computer data utilizes error correction techniques to ensure exact fidelity of the data. Equipment such as compact disc players, digital audio tape recorders and players also employ error correction techniques to provide high fidelity output. However, for convenience, a further discussion of multiple access wireless communications is included herein to describe processing of data with error corrections.

Existing wireless communication systems generally employ a match between the transmitter encoding and the receiver decoding schemes. The transmitter typically incorporates one or more encoders, one or more interleavers, a symbol generator (i.e. bit to symbol mapper) and modulator. Input data bits to be transmitted are input to the encoder that can encompass one of the various error correction encoders such as Reed Solomon, convolutional encoder, and parity bit generator. The function of each encoder is to add redundancy to enable detection and/or correction of errors in transmission. The output bits from the encoder may then be interleaved wherein the order of the bits is changed to more efficiently combat burst errors. The re-arrangement of the bits caused by interleaving improves the resistance to error bursts while adding latency and delay to the transmission. The first encoder is called the outer encoder and the second encoder is called the inner encoder. The purpose of applying two encoders rather than one (more complex) more powerful code is to reduce the decoding complexity required at the receiver while combating the effects of different types of transmission errors, such as burst errors caused by channel fading as well as random bit errors caused by white noise.

The output bits from the second interleaver are then mapped to symbols by a bit to symbol mapper, wherein the bit to symbol mapper transform the bits to modulator symbols. For example, an 8-PSK (phase-shift keying) modulator uses 8 symbols and the mapper takes three bits and converts them to one of eight symbols. Thus, the bit to symbol mapper generates a symbol for every three input bits in that example.

The output from the symbol mapper is input to a modulator that receives symbols in the M-ary alphabet and generates the analog signal that is subsequently transmitted over the channel by an antenna in wireless applications. The channel may comprise a mobile wireless channel, such as cellular or satellite. There can also be hard wired channel, such as a cable such as Ethernet. The industry strives to employ a transmitter that generates a signal in such a way that it is correctly reconstructed by the receiver.

At the receiver, the analog signal from the channel is input to a front end section that demodulates and samples the received signal to generate received samples y(k). There can also be amplification and filtering at the receiver to boost signal levels and eliminate or reduce noise components. The samples are input to a signal processor such as an equalizer that compensates for the inter-symbol interference (ISI) caused by the delay and time spreading of the channel in attempting to detect the symbols transmitted by the modulator.

In a CDMA system, each signal is transmitted using spread spectrum techniques. The transmitted informational data stream is impressed upon a much higher rate data stream termed a signature sequence. The bit stream of the signature sequence data is typically binary, and can be generated using a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

In operation, a plurality of spread information signals, such as binary phase shift keying (BPSK) or quadrature phase shift keying (QPSK) modulation, modulate a radio frequency (RF) carrier and are jointly received as a composite signal at the receiver. Each of the spread signals overlaps all of the other spread signals, as well as noise-related signals, in both frequency and time. The receiver correlates the composite signal with one of the unique signature sequences, and the corresponding information signal is isolated and despread.

A signature sequence is normally used to represent one bit of information. Receiving the transmitted sequence or its complement indicates whether the information bit is a +1 or −1, sometimes denoted "0" or "1". The signature sequence usually comprises N pulses, and each pulse is called a "chip". The entire N-chip sequence, or its complement, depending on the information bit to be conveyed, is referred to as a transmitted symbol. The receiver correlates the received signal with the complex conjugate of the known signature sequence to produce a correlation value. When a 'large' positive correlation results, a "0" is detected, and when a 'large' negative correlation results, a "1" is detected.

It should be understood that the information bits could also be coded bits, where the code is a block or convolutional code. Also, the signature sequence can be much longer than a single transmitted symbol, in which case a subsequence of the signature sequence is used to spread the information bit.

Multipath dispersion occurs when a signal proceeds to the receiver along not one but many paths so that the receiver encounters echoes having different and randomly varying delays and amplitudes. Co-channel interference refers to signals received from other users either directly or reflected. The receiver receives a composite signal of multiple versions of the transmitted symbol that have propagated along different paths, called rays, having different relative time. Each distinguishable ray has a certain relative time of arrival, a certain amplitude and phase, and as a result, the correlator outputs several smaller spikes. RAKE receivers are well known and attempt to 'rake' together all the contributions to detect the transmitted symbol and recover the information bit.

Conventional RAKE receivers provide satisfactory performance under ideal conditions, however the signature sequence must be uncorrelated with time shifted versions of itself as well as various shifted versions of the signature sequences of the other CDMA signals. If one received signal corresponding to the signature sequence of interest has a non-negligible cross correlation with the received signal originating from another transmitter, then the value measured at the receiver, e.g. the correlation value for the signal of interest, is corrupted. In other words, the correlation computed at the receiver that would be used to decode a particular signal of interest is overwhelmed by an interfering signal; this is referred to as the near-far problem. The interference caused by an echo of one transmitted symbol overlapping with the next transmitted symbol must also be negligible. If this is not true, the transmitted symbols interfere with past and future transmitted symbols, commonly referred to as intersymbol interference (ISI). In actuality, performance is degraded by other signal interference and ISI.

There has been much research to address signal interference with known multipath time dispersion. This is termed joint demodulation with no multipath and is further described in S. Verdu, "Minimum Probability of Error For Asynchronous Gaussian bMultiple-Access Channels," IEEE Trans. Info. Theory, Vol. IT-32, pp. 85–96, R. Lupas and S. Verdu, "Linear multiuser detectors for synchronous code-division multiple-access channels," IEEE Trans. Inform. Theory, Vol. 35, pp. 123–136, Jan. 1989; and R. Lupas and S. Verdu, "Near-far resistance of multiuser detectors in asynchronous channels," IEEE Trans. Commun., Vol. 38, pp. 496–508, April 1990.

There are a host of approaches for jointly demodulating any set of interfering digitally modulated signals, including multiple digitally modulated signals. Maximum Likelihood Sequence Estimation determines the most likely set of transmitted information bits for a plurality of digital signals without multipath time dispersion. The maximum likelihood joint demodulator is capable, in theory, of accommodating the largest number of interfering signals, but has a prohibitive computational complexity that makes it unrealizable in practice. The decorrelation receiver is another, less computationally complex receiver processing approach that zeroes out or decorrelates the different signals so that they no longer interfere with one another. The decorrelator, as well as virtually every other lower complexity joint demodulator, is not capable of operation when the number of signals is over a set threshold which falls significantly short of the theoretical maximum.

In a real world multi-user system, there are a number of independent users simultaneously transmitting signals. These transmissions have the real-time problems of multi-path and co-channel interference, fading, and dispersion that affect the received signals. As described in the prior art, multiple user systems communicate on the same frequency and at the same time by utilizing parameter and channel estimates that are processed by a multi-user detector. The output of the multi-user detector is an accurate estimation as to the individual bits for an individual user.

Multi-user detection (MUD) refers to the detection of data in non-orthogonal multiplexes. MUD processing increases the number of bits available per chip or signaling dimension for systems having interference limited systems. A MUD receiver jointly demodulates co-channel interfering digital signals.

Optimal MUD based on the maximum likelihood sequence estimator operates by comparing the received signal with the entire number of possibilities that could have resulted, one for each bit or symbol epoch. Unfortunately, this processing is a computationally complex operation and it is not possible to accomplish in a real-time environment. Thus for those multi-user detectors that examine the entire space, real-time operation is often elusive.

In general, optimal MUD units function by examining a number of possibilities for each bit. However, for multi-user detectors that examine a larger capacity of signal, the computations are complex and time-consuming, thus making real-time operation impossible. Numerous attempts at reliable pruning of the optimal MUD decision process or the use of linear approximation to the replace the optimal MUD have still not produced a workable solution for the real world environment.

There are various multiuser detectors in the prior art, including optimal or maximum likelihood MUD, maximum likelihood sequence estimator for multiple interfering users, successive interference cancellation, TurboMUD or iterative MUD, and various linear algebra based multi-user detectors such as all of those detailed in the well-know text "Multiuser Detection" by Sergio Verdu. In basic terms, turbodecoding refers to breaking a large processing process into smaller pieces and performing iterative processing on the smaller pieces until the larger processing is completed. This basic principle was applied to the MUD.

There are several suboptimal multiuser detectors that are less computationally complex. One example of suboptimal detectors, called linear detectors, includes decorrelators, minimum mean square error or MMSE detectors, and zero-forcing block linear equalizers. But, linear algebra based MUD (non-iterative) and successive interference cancellation fails for cases of overloaded multiple access systems. One example of overloading is where the number of simultaneous users is doubled relative to existing state of the art. Even for underloaded multiple access systems, the performance of non-iterative MUD and successive interference cancellation degrades significantly as the number of users increases, while the computation complexity of the optimal MUD increases significantly as the number of users increases. The computing problems are so extreme that it requires extensive and expensive hardware as well as complex processing. Moreover, an unreasonable delay would be required to decode each bit or symbol rendering such a system useless in practice.

Low complexity multiuser detectors have been contemplated that use linear multiuser detectors to achieve optimal near-far resistance. (Near-Far Resistance of Multiuser Detectors for Coherent Multiuser Communications, R. Lupas, S. Verdu, IEEE Trans. Commun. Vol 38, no. 4, pp 495–508, April 1990). While providing certain advantages, the performance has not been demonstrably improved. Varanasi and Aazhang proposed a multistage technique as described in the article Near-Optimum Detection in Synchronous Code-Division Multiple Access Systems, IEEE Trans. Commun., vol 39, No. 5, May 1991.

Decorrelating decision feedback detectors (DDFD) have been described by A. Duel-Hallen in Decorrelating Decision-Feedback Multiuser Detector for Synchronous Code-division Multiple Access Channel, IEEE Trans. Commun., vol 41, pp 285–290, February 1993. Wei and Schlegel proposed soft-decision feedback to suppress error propagation of the DDFD in Synchronous DS-SSMA with Improved Decorrelating Decision-Feedback Multiuser Detection, IEEE Trans. Veh. Technol., vol 43, pp 767–772, August 1994.

Another reduced complexity MUD general approach is based on tree-pruning help to some extent to eliminate the proper bit combination from consideration (i.e. prune the proper path in the decision tree) based on information from an unreliable bit estimate. For instance, the M-algorithm is a pruning process that limits the number of hypotheses extended to each stage to a fixed tree width and prunes based on ranking metrics for all hypotheses and retaining only the M most likely hypotheses. The T-algorithm prunes hypotheses by comparing the metrics representing all active hypotheses to a threshold based on the metric corresponding to the most-likely candidate. Performance of M-algorithm based MUD degrades as the parameter M is decreased, but M governs the number of computations required. Similar effects and tradeoffs are seen for other tree-pruning based MUD (T-algorithm, etc). To combat improper pruning, basic tree-pruning must ensure that M is "large enough", and therefore still encounters increased complexity for acceptable performance levels when the number of interfering signals and/or ISI lengths are moderate to large.

An illustration of the M-algorithm as a tree-pruning algorithm is a tree made up of nodes and branches. Each branch has a weight or metric, and a complete path is sequences of nodes connected by branches between the root of the tree and its branches. When applied as a short cut to the optimal MUD, each branch weight is a function of the signature signal of a certain transmitter, the possible bit or symbol value associated with that transmitter at that point in time, and the actual received signal which includes all the signals from all the interfering transmissions. The weight of each path is the sum of the branch metrics in a complete path. The goal of a tree searching algorithm is to try to find the complete path through a tree with the lowest metric.

In an article by Paul D. Alexander, Mark C. Reed, John A. Asenstorfer and Christian B. Schlagel in IEEE Transactions on Communications, vol. 47, number 7, July 1999, entitled "Iterative Multi-User Interference Reduction: Turbo CDMA", a system is described in which multiple users transmit coded information on the same frequency at the same time, with the multi-user detection system separating the scrambled result into interference-free voice or data streams.

The turboMUD system applies the "turbo principle" by modeling the multiuser channel as a convolutional code, thereby modeling the overall transmitted system as a serial concatenation of two convolutional codes—the actual error correction code and the effects of the modulation and multi-user interference. A MUD algorithm within the TurboMUD system determines discrete estimates of the transmitted channel symbols, with the estimates then provided to a bank of single-user decoders (one decoder for each user) to recover the input bit streams of all transmitted signals. If two codes were employed at the transmitter, the prior art TurboMUD uses the second error correction code and the channel to form a decoding turbo-loop. The outer decoder is simply applied after the TurboMUD is complete.

In an attempt to provide real-time performance by reducing the computational complexity of an iterative multi-user detector that can produce soft values, the prior references suggests algorithms for examining less than the total number of possibilities for each of the bits of data that are coming in from the multiple users. The "shortcuts" taken by this reduced complexity approach cause errors and combating these errors by increasing the number of iterations of the system completely nullifies any advantage.

Generally, error control coding expands the information sequence by adding additional bits for error correction/detection. The encoded sequence then contains some constraint or redundancy that is used by the receiver to identify possible errors in the received sequence. For example, if the received sequence does not satisfy parity-check equations, then the receiver detects the existence of some possible errors and corrects them according to the parity check rule. In other words, error correcting codes insert redundancy into digital information streams at the transmitter, thereby reducing susceptibility to noise and increasing receiver reliability. Incorporating error correcting coding at the transmitter allows the receiver to detect and possibly correct errors caused by noise or interference. Various error detection and correction (EDAC) techniques have been developed that effectively enable digital communications despite error rates inherent in digital communications.

Error control codes such as block codes and convolutional codes are usually applied to digital sequences expected to encounter burst and random errors, so that some portion of the errors may be corrected at the receiver. For example, the powerful Reed-Solomon EDAC provides the ability to correct multiple bit errors in high-noise interference environments such as critical space communications. Reed-Solomon coding originated in the article entitled: "Polynomial Codes over Certain Finite Fields" and uses Galois Field arithmetic to map blocks of a communication into larger blocks. In effect, each coded block corresponds to an over-specified polynomial based upon the input block.

It should be understood that convolutional codes are somewhat inefficient at a handling large number of consecutive errors. In order to combat burst error in channels, system transmitters typically apply a block code before the convolutional code, so that the matching receiver must apply a block decoder after convolutional decoding. The block code recognizes an error condition and realizes certain erasures or indeterminate bits, depending on decoding sequence wherein the code. For a certain minimum number of erasures, it is able to correct for the indeterminate bits, as the block code operates according to expected results depending upon the decoding method. The block decoding calculates some number that matches the code book set which indicates the expected bits at certain location, and generates a flag if the expected bits do not match the code book set. For example, if the decoding processing knows that the book set can only have '10101 . . . ' and the decoded bit stream is '01101 . . . ', a flag is generated indicating a possible error condition of the first two bits.

One way to create the redundancy needed for error correction is by appending additional bits to fixed-length blocks of source data and transmitting the composite signal at a higher data rate. Alternatively, trellis codes, such as convolutional codes, can add redundancy by outputting specific sequences based on the encoder memory state and current incoming bits. Each transmitted symbol represents not only the current uncoded bit or set of bits, but also contains historical information, reflected in state information that can be derived from the received sequence of symbols. This redundancy permits the transmitted symbol sequence to be accurately reconstructed in a decoding operation even though noise and distortion have altered the message-bearing signal during transmission.

A concatenation of two error correcting codes is sometimes implemented through the use of a concatenated encoding system and a corresponding concatenated decoding system in order to lower the BER to acceptable levels without exponentially increasing the decoder complexity. Concatenated coding refers to the sequence of coding in which a second coding operation is performed upon already encoded data. An "outer code" of the concatenated coding is the first code applied at the transmitter, while the "inner code" of the concatenated coding is the code applied second at the transmitter. Then at the receiver, the decoding process for the inner code is done first, followed by the decoding needed for the outer code.

Combining block coding, such as Reed-Solomon, and convolutional coding correct both burst and random errors in a continuous stream of convolved data bits. The block coding corrects for burst errors while the convolutional coding corrects random errors.

Interleaving is often placed between the two encoders, because when the inner decoder makes erroneous decisions, it tends to create bursts of errors due to the nature of the convolutional code. The interleaving disperses adjacent bit values and prevents a burst error from affecting a sequential run of bits in the original data stream.

Parallel concatenated convolutional codes (PCCC's) or turbo codes have been shown to provide enhanced performance. The use of Turbo codes for error correcting has also enhances the reception capabilities of signals in less than perfect envirornents. The Turbo codes involve an iterated combination of two or more recursive systematic convolutional codes, where the codes of the encoder output bits include unaltered input bits. The convolutional codes are typically identical and applied to an input bit sequence and an interleaved version of the input bit sequence. In the case of continuous data transmission, turbo coding requires that the data stream be packetized into blocks for processing an entire message by blocks of N data bits.

Turbo codes use an iterated decoding technique wherein each successive decoding step outputs soft decisions usable as input to the next decoding step. The output of the encoder comprises systematic bits, the input bit sequence itself, and parity bits that can be punctured to provide a desired rate of encoding. By employing Turbo codes, the processing can approach the limit of channel capacity in the presence of noise set by the Shannon theorem. The performance of a Turbo Code depends on a number of factors such as the constituent codes, interleaver, information block size and number of decoder iterations. The factors can be tweaked for optimal processing for a particular application. For further details, see C. Berrou et al. entitled "Near Shannon Limit Error-Correcting Coding And Decoding: Turbo-Codes", Proceedings of the IEEE International Conference on Communications, 1993, pages 1064–1070; and Hagenauer, Iterative Decoding of Binary Block and Convolutional Codes, IEEE Transactions on Information Theory, Vol. 42, No. 2 (March 1996).

A typical Turbo encoder uses a parallel concatenation of two systematic and recursive convolutional codes separated by interleaving. The turbo principal originally applied to two codes specifically designed for concatenated operation, has also been applied to other coding environments. For example, the turbo principal was used to develop an error correction coding scheme using three component codes in the paper S. Benedetto, D. Divsalar, G. Montorsi, F. Pollara, in "Analysis, Design and Iterative Decoding of Double Serially Concatenated Codes with Interleavers", IEEE Journal on Selected Areas in Commnunications, vol 16, no 2, February 1998. Benedetto et al proposed and designed a doubly serially concatenated coding system in which three encoders, all of the same type and all designed specifically to operate well with each other, are concatenated. At the receiver, the turbo principal is applied sequentially to the inner, middle and outer codes to decode the received signal. This double serially concatenated approach addresses the scenario wherein the concatenated codes are either all block codes or all convolutional codes for the inner, middle and outer codes.

The "turbo principle" or "turbo decoding" refers to the iterative decoding method originally developed for turbo codes, which consist of carefully designed serial-concatenated or parallel-concatenated codes known in the art. The Turbo decoding method is used to achieve high performance for general (non-turbo-coded systems) with concatenated codes or concatenated elements. While usually employed for single users, it is noted that the effects of multiuser interference can be considered a code-like operation and that a multiuser system with error correction coding benefits from an iterative turbo decoding approach. For example, turboMUD, as described herein, applies the turbo principal to a multiuser interference channel, one convolutional code and one optional interleaver. The channel is modeled as a code and even though the system and components are not a designed turbo code, a turbo loop at the receiver improves the bit error rate performance of the system. For instance, Herzog, Schmidbauer, Hagenauer, "Iterative Decoding and Despreading improves CDMA-Systems using M-ary Orthogonal Modulation and FEC", Proceedings of ICC 97 showed that turbo decoding provides performance gains of more than 1.5 dB over non-iterative decoding for the CDMA system that was examined. Additionally, certain methods to reduce the complexity of the MUD turbo decoding ("turboMUD") have been utilized and are generally successful with the limitations and disadvantages noted herein.

The growing demand for error-free processing of digital signals requires an improvement to the detection and decoding techniques, especially a multi-user environment. What is needed is a practical and workable scheme that improves the bit error rate performance and allows for the reception and detection of a greater number of signals within a limited bandwidth and with greater reliability.

BRIEF SUMMARY OF THE INVENTION

The invention is devised in the light of the problems described herein, and a general object of the present invention to provide a novel and useful decoding technique that can solve the problems noted in the existing systems.

Thus, this present invention addresses the problems associated with decoding in multiple access communications channels. The new method decreases the likelihood of improper decoding of the final values of interest, thereby allowing for a reduction in the number of iterations performed and, therefore, a reduction in complexity without negatively impacting performance. For the same reduced complexity MUD parameters and number of iterations, the present invention provides for superior performance when compared to other reduced-complexity MUD known in the art, followed by a separate decoder for the additional component(s).

One aspect of the invention is the incorporation of the results of additional decoder components into the iterative decoding process to improve the performance of a multiuser detector/decoder. Another aspect is applying a chained multi-turbo approach to a system with dissimilar components, such as one convolutional code, one block code and one component resembling a convolutional code caused by multi-user interference.

The subject of the invention disclosed in this application does not require that the signals correspond to any particular multiple access (MA) scheme, or any limitation to wireless processing. For example, the present invention operates in the same manner on any set of digitally modulated interfering signals to include cellular CDMA systems, TDMA systems, FDMA systems, storage medium, wired MA systems such a cable modems, wireless local area network systems, or yet undetermined systems. For example, Spatial Division Multiple Access (SDMA) is generally a satellite communications mode that optimizes the use of radio spectrum and minimizes system cost by taking advantage of the directional properties of dish antennas, and benefits from the bit processing described herein. The only requirement for viable operation of the present invention is that each signal source produces a signal with the information digitally modulated using a signature pulse or finite duration signal of some sort. While CDMA is described for illustrative purposes to explain the invention, the specific example of CDMA is merely for ease of understanding. The present invention is directed to any other form of digital communication or signal storage methods by simply replacing the words in the CDMA discussions "signature sequence" with "signature signal" or "signature pulse" and replacing the words "CDMA signal" with "digitally modulated signal".

A further feature of the present invention is that it works equally well using mixed rate communication systems such as IS95, wherein the user chooses the transmission rate. The parameter estimator that handles the differing transmission rates passes along the information to the present system.

Based upon the performance results of turboMUD methods and the recognition that topologies like the Astrolink system using GSM, IS-95 system, and other communication methods have two or more serially concatenated codes in their transmission processing chain, as well as a channel that can be modeled as a convolutional code, the present invention incorporates multiple codes in a turbo-decoding receiver. For example, state of the art decoders contain a Reed-Solomon (RS) block code in addition to a convolutional code and multiuser interference that are typically addressed by the turboMUD. The state of the art decoders for such systems use a straightforward partitioned (non-iterative) way of decoding the RS code at the receiver by simply appending a bank of RS decoders to the turboMWD unit.

The present invention in one embodiment is a multi-user detector processing system for multiple access communications channels, comprising a multi-user detector coupled to a plurality of user signals, wherein the multi-user detector produces a first set of symbol estimates for each of the user signals. There is a first bank of decoders coupled to the symbol estimates producing a first decoded data stream, and a second bank of decoders coupled to the first bank of decoders processing the first decoded data stream and producing a second decoded data stream, wherein the second decoded data stream is passed back to the first bank of decoders for processing of a third decoded data stream, and wherein the third decoded data stream is passed back to the multi-user detector for processing of a second set of symbol estimates for each of the user signals.

The multi-user detector of the multi-user detector processing system can employ, for example, algorithms selected from the group comprising M-algorithm, T-algorithm, MT algorithm, Q-algorithm, and FANO algorithm. The Q-algorithm is disclosed in U.S. patent application Ser. No. 10/105,918, filed Mar. 25, 2002 entitled "System for Decreasing Processing Time in an Iterative Multi-User Detector System" which is incorporated by reference herein for all purposes.

In one variation the first bank of decoders are convolutional decoders and the second bank of decoders are block decoders. In another variation the first bank of decoders are convolutional decoders and the second bank of decoders are convolutional decoders. And in a further variation the first bank of decoders are block decoders and the second bank of decoders are block decoders.

The convolutional decoders of the multi-user detector processing system can be, for example, selected from the group comprising maximum a posteriori (MAP) decoders, soft-output Viterbi algorithm (SOVA) decoders, and Bahl, Cocke, Jelinek, Raviv (BCJR) decoders.

In certain embodiment the multi-user detector processing system may include an interleaver and a de-interleaver coupled between the multi-user detector, the first bank of decoders and the second bank of decoders.

The multi-user detector processing system can also include a hard decision unit coupled to the low complexity bank of decoders processing the soft data stream producing a final data stream for each of the user signals.

Another embodiment for the multi-user detector processing system includes a filter unit coupled to the user signals and the multi-user detector, wherein the filter unit can be selected from the group comprising a whitening matched filter bank and a matched filter bank.

A further variation on the multi-user detector processing system includes further iterative processing of the second set of symbol estimates by the first bank of decoders and the second bank of decoders. The iterative processing continues until a final condition is obtained, wherein the final condition can be selected from the group comprising an allowable performance level and a fixed number of iterations.

The present invention includes an embodiment for a method for processing receiver signals from multiple users, wherein the method comprises estimating a set of symbols from the receiver signals for each of the users using a multi-user detector; decoding the set of symbols using a first decoder and producing a set of corrected first decoder values; decoding the first decoder values with a second decoder and producing a set of corrected second decoder values; decoding the set of corrected second decoder values using the first decoder and producing a set of re-corrected first decoder values; and, re-estimating the set of symbols using the re-corrected first decoder values.

The method can further comprise repeating the steps of decoding the set of symbols using the first decoder and decoding the first decoder values with the second decoder until a final state is obtained and outputting a final data stream for each user. The final state can be determined by setting a fixed number of iterations or by setting an allowable performance level.

Other variations can include performing parameter estimation of the receiver signals, filtering the receiver signals and also de-interleaving and interleaving.

In one respect the present invention is a Turbo Multi-User Detector for processing a plurality of received signals, comprising a parameter estimation unit coupled to the received signals and a multi-user detector coupled to the parameter estimation unit. The multi-user detector provides a plurality of information streams, one stream corresponding to each of the received signals. There is a bank of convolutional decoders coupled to the plurality of information streams, wherein the convolutional decoders output a plurality of refined information streams. There is also a bank of block decoders coupled to the plurality of refined information streams, wherein the block decoders output a plurality of refined-improved information streams, wherein the plurality of refined-improved information streams are fed back to the bank of convolutional decoders output a plurality of further refined-improved information streams which are fed back to the multi-user detector.

The Turbo Multi-User detector can further comprise an iterative processing between the multi-user detector, the bank of convolutional decoders and the bank of block decoders until a final condition is reached and the bank of block decoders output a final plurality of symbol streams.

The features and advantages described herein are not all-inclusive and, in particular, many additional features and advantages will be apparent to one of ordinary skill in the art-in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which:

FIG. 2b illustrates the process flow of the data through the partitioned TurboMUD and decoders of FIG. 2a;

DETAILED DESCRIPTION OF THE INVENTION

The description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

Figure 1:
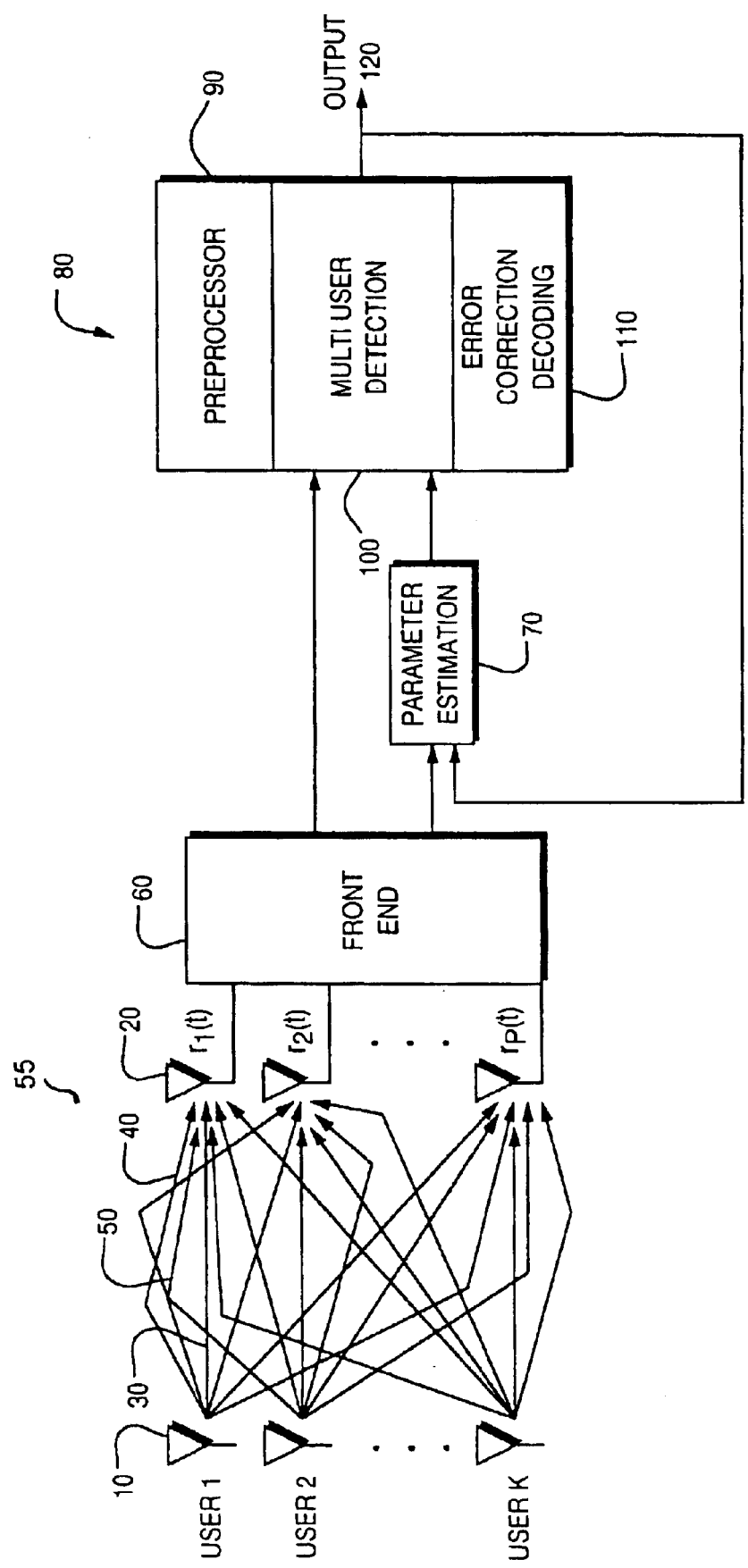
FIG. 1 shows a basic wireless communications system for multiple users illustrating the transmitted signals, reception, basic MUD processing blocks to resolving the user signals.

A typical communication wireless application for the present invention is shown in FIG. 1, wherein a number of users (1 to K) generate signals that are sent by transmitters 10 into free space. There is normally a noise component 55 that is introduced from the environment of a random nature in the received signal. While any noise 55 that has a repeatable or non-random nature can be eliminated or minimized through processing, random noise elements are reduced in other manners. The various signals are received at antennas (1-p) 20, wherein there is one signal for each polarization feed. The signals represent directly received signals 30, as well as multi-path signals 40 from the same user, and interfering signals 50 from other users.

The plurality of signals from each antenna 20 is processed in a front end unit 60. The RF front end unit 60 downconverts the higher frequency signals into baseband signals for ease of processing. The baseband signals are also digitized by analog to digital converters (A/D) (not shown). The front end 60 cooperates with the parameter estimation unit 70 to retrieve needed information for the signals such as relative received timing offsets, carrier phase, frequency offsets, received amplitudes, and multipath structure for each of the interfering signals present in the received signal.

The front end unit 60 and the parameter estimator 70 are both coupled to a multi-user detector (MUD) stage 80 for processing of the signals. The MUD stage 80 consists of basic functional blocks of a preprocessor block 90, MUD block 100, one or more error correction decoding blocks 110 that process the digital data and extract the user signals. The format is typically one measurement per 'dimension' per symbol. The preprocessor 90 conditions the signals for improved processing. The multi-user detection stage 100 is detailed herein and cooperates with the error correction decoding (ECD) 110 for iterations of a TurboMUD processing.

The output 120 of the iterative MUD stage 80 is returned for a number of iterations in conjunction with the parameter estimation unit 70 that uses the data from the MUD stage 80 for subsequent processing. When the output K bit stream 120 has reached a certain level of processing, the output signals 120 are forwarded to the output stage (not shown). The number of iterations can be fixed or based on a desired level of processing.

The basic iterative MUD procedure is well known from published literature such as Poor, "Turbo Multiuser Detection: An overview," IEEE $6^h$ Int. Symp. On Spread-Spectrum Tech. And Appli., NJIT, New Jersey, Sept. 6–8, 2000 and Alexander, Reed, Asenstorfer, and Schlegel, "Iterative Multiuser Interference Reduction: Turbo CDMA," IEEE Trans. On Comms., v41, n7, July 1999. The iterative MUD is representative of the approaches used to incorporate turbo decoding methods into joint MUD/FEC (Forward Error Correction) decoding and to then reduce the complexity of the system.

It should be readily appreciated that the reference to the iterative embodiment or Turbo-MUD is described herein while the non iterative MUD that runs a single cycle through the process is within the description.

An input signal of raw non-manipulated data from the front end 60 is comprised of the aggregate of many signals from many different transmitters, where each signal is assigned a (frequency, timeslot, and/or spreading code) from a finite set of channels. This digital input signal or raw input data is then input to the multiuser detector (MUD) stage 80. The MUD processing can employ the various state of the art schemes, including maximum likelihood (ML), minimum mean-squared error (MMSE), M-algorithm, T-algorithm, Fano-algorithm and other full or reduced-complexity approaches known to those in the art.

The parameter estimation unit 70 processes the various parameters from the received raw data, and provides certain data to the MUD stage 80. The parameter estimation unit 70 is known in the art, and a detailed description of one such estimation unit is published in U.S. patent application 2002/0037061 A1 entitled "System for Parameter Estimation and Tracking of Interfering Digitally Modulated Signals", which is commonly owned and incorporated by reference for all purposes.

In an optimal case, the MUD block 100 is a full-complexity MAP detector. Suboptimal reduced complexity MAP-based approaches are also known in the relevant art. The bit streams from the MUD block 100 are passed to a bank of error correction decoders 110. In the non-iterative MUD, the raw data is processed by an algorithm of the MUD 100 and the error correction decoders 110 outputs the data stream for each user either in soft or hard output. The iterative MUD or TurboMUD can be structured as a hard output or soft output processing, however in order to demonstrate a working embodiment, the soft output version is addressed herein, but it is well within the scope of the present invention to utilize hard outputs.

In a Turbo-MUD system, decoding and confidence information is passed between the MUD block 100 and decoder block 110. Maximum a posteriori (MAP) decoders (or approximations of MAP decoders) are well known to those in the art and are used for both the MUD and single-user (SU) decoders, so that soft output information is available if desired.

The MUD block 100 outputs a bit (or symbol) stream associated with each interfering signals present on the channel for one data block. Deinterleavers and interleavers (not shown) are optional elements coupled between the MUD block 100 and the decoders 110 that are used if the transmitted signals are interleaved, such as the CDMA format. The MUD block 100 generally passes soft decisions in the form of reliability, or confidence, measures to the decoders 110. The reliability measures are presented with one associated with each symbol of each user to the bank of decoders 110. If the signals were transmitted with interleaving, the reliability measures from the MUD block 100 are first passed through a deinterleaver (not shown) and passed on in shuffled form to the decoder 110. Shuffling refers to processing the same values but changes the placement or presentation of the values. The time-shuffled conditional probabilities are input back to the MUD block 100.

In one known variation, there is a bank of error correction decoders 110 that provide soft output values associated with prior probabilities. Viterbi decoders can be used, but these generally outputs hard values. Single user decoders calculate conditional probabilities, one for each decoded symbol of each user, and output them as confidence values back to the MUD block 100. Soft input soft output decoders, such as MAP or soft-output Viterbi algorithmn (SOVA) decoders are examples known in the art.

MAP decoding is well known and further described in C. Schlegel, Trellis Coding, IEEE Press, 1997; Robertson, Villebrun and Hoeher, "A Comparison of Optimal and Sub-Optimal MAP Decoding Algorithms Operation in the Log Domain," ICC95; Hagenauer, and Hoeher, "A Viterbi Algorithm with Soft-Decision Outputs and its Applications," Globecom 89; Pottie and Taylor, "A Comparison of Reduced complexity Decoding Algorithms for Trellis Codes," J Sel. Areas in Comm December 1989. The iterative turbo principle, on which Turbo MUD is based, is described by Berrou, Glavieux, and Thitimajshima, "Near Shannon Limit Error-Correcting Coding and Decoding: Turbo-Codes "1" ICC 93; Berrou and Glavieux, "Near Optimum Error Correcting Coding and Decoding: Turbo-Codes", Trans on Comm, October 1996; and Wang and Kobayashi, "Low-Complexity MAP Decoding for Turbo Codes", Vehicular Technology Conference 2000). Turbo MUD approaches are described in, for example, Alexander, Reed, Asenstorfer, and Schlegel, "Iterative Multiuser Interference Reduction: Turbo CDMA," Trans on Comm, July 1999; Poor, "Turbo Multiuser Detection: An Overview, "ISSSTA 2000; and Wang and Poor, "Iterative (Turbo) Soft Interference Cancellation and Decoding for Coded CDMA", Trans on Comm, July 1999.

For TurboMUD processing, soft outputs for each bit of each user from the bank of decoders 110 are fed back to the MUD block 100 for each iteration. The MUD block 100 takes these soft inputs along with the original raw input signal to calculate an improved, less corrupted bit stream for each user. This iterative process continues until the desired quality is reached or a fixed number is reached. At that point, estimates of the data sequences for all active users are output. Operation then commences for the next block of data, repeating the process described above.

The number of iterations for processing between the MUD block 100 and the decoders 110 can be set to a fixed counter or by checking if there were significant changes to the data from the last iteration. Once the data is no longer being altered or reaches a certain iteration counter limit, the data from the decoder 110 can be output 120 as final estimates of what the user sent. As stated, a fixed number of iterations can be stored and used for the processing by the decoder block 110. Alternatively, the information between the MUD block 100 and the decoders 110 can repeat in subsequent iterations until an asymptote is reached or the desired performance level is attained. A buffer can store the previous values and compare them to the latter processed values during the subsequent iterative process.

When processing is completed, the soft output of the bank of error decoders 110 is passed to a hard decision unit (not shown) which outputs the final stream of decisions or output data stream 120 for each interfering user for the current data block.

Figure 2A:
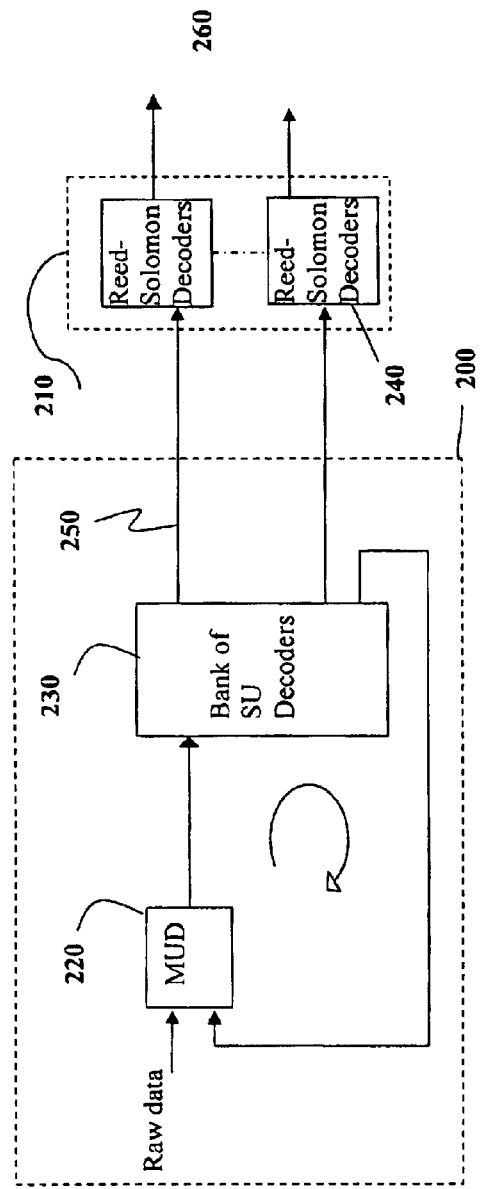
FIG. 2a shows a Partitioned TurboMUD and Reed-Solomon decoder known in the art.

FIG. 2a shows an existing basic decoder processor block diagram for a doubly encoded signal that encounters multiuser interference, which is addressed with a TurboMUD scheme and separate outer decoder. There are two basic partitioned blocks, namely a TurboMUD block 200 and a decoder block 210. The TurboMUD block 200 has the basic elements such as a MUD section 220 that receive data from a front-end (not shown) along with parameter estimation values as known in the art. The MUD section 220 is coupled to a bank of single user (SU) convolutional decoders 230 for performing some error corrections to the MUD output. The output of the (inner) SU decoders 230 goes back to the MUD 220 until certain conditions are satisfied and is then output 250 as hard values to the (outer) block decoder section 210. In this embodiment, the block decoders 210 are a bank of Reed-Solomon decoders 240 for additional processing of the bit estimates before being output 260 as hard values for each user's data stream.

As detailed herein, Turbo decoding is an iterative decoding method originally developed for turbo codes, namely two serially concatenated codes or two parallel concatenated codes. Subsequent turbo decoding methods have been used to achieve high performance for general systems with concatenated codes. The straightforward (non-iterative) way of decoding the RS code at the receiver is to simply append a bank of RS decoders to the turboMUD unit, wherein FIG. 2a shows the partitioned approach to adding the RS decoder to the receiver Referring again to FIG. 2a, it is assumed that parameter estimates are input to the MUD detector 220 along with the raw (measured) data. The MUD detector 220 passes soft decisions in the form of reliability, or confidence, measures to the single user decoders 230. There is one reliability measure associated with each symbol of each user, and the single user decoders 230 calculate both conditional probabilities, one for each decoded symbol of each user, and estimates of the decoded bits. The bank of single-user decoders 230 can be any type of decoder, preferably a soft-output decoder such as Bahl, Cocke, Jelinek, Raviv (BCJR) or Soft-output Viterbi Algorithm (SOVA).

The single user decoders 230 use the corrected symbol estimates to update the conditional symbol probabilities transmitted back to the MUD 220. The conditional probabilities are then used by the MUD algorithm 220 to determine new symbol estimates. The single user decoders 230 then recalculate new bit estimates and output these values.

The passing of information between the MUD 220 and the SU decoders 230 repeats in subsequent iterations until an asymptote is reached or the desired performance level is attained. In one embodiment the number of iterations can be a fixed number that is determined to produce satisfactory results within a given time period. Once the TurboMUD section 200 is completed, the data output 250 is passed along to the RS decoders 210 to establish the information sequence estimates. The estimated decoded bits 250 are used by the bank of RS decoders 210 to estimate values for the information bits and output them as final data bit estimates 260. The RS decoding method can be any type of RS decoder known to those in the art.

Figure 2B:
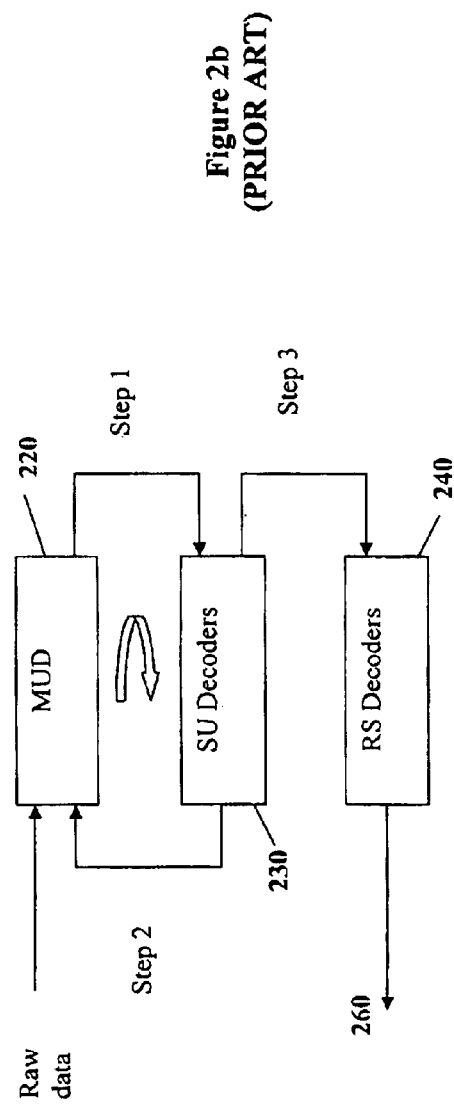

The process flow of the iterative decoding is presented in FIG. 2b. The raw data with the parameter estimation values is input to the MUD 220 and is delivered to a bank of single-user decoders 230 shown by the numbered Step 1. There is an iterative processing between the MUD block 220 and the convolutional decoders 230 shown as Step 2. Step 1 and Step 2 are repeated for a number of times according to the rule used by the embodiment, such as a performance asymptote or fixed number of iterations. When the iterative processing between the MUD block 220 and the SU decoder block 230 is completed, the data is then forwarded to a bank of block decoders 240 for final processing shown as Step 3 before being output 260. Thus, the data and information obtained from the block code processing is not re-introduced into the TurboMUD section 200 for further processing. The interleavers and deinterleavers are not illustrated, but are additional elements that are implemented for transmissions employing interleaving.

Figure 3A:
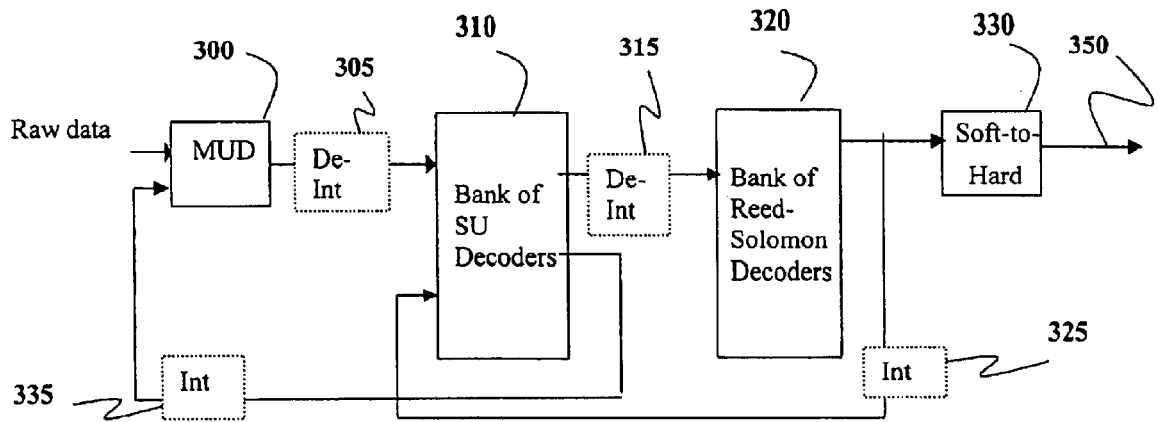
FIG. 3a illustrates a Multi-TurboMUD configuration according to the present invention with a MUD section and decoder sections.

FIG. 3a illustrates one embodiment of the present invention that uses the information derived from block codes such as Reed Solomon decoders and directs the block code outputs back to the convolutional decoders and into the MUD to correct any errors within the MUD.

Figure 3B:
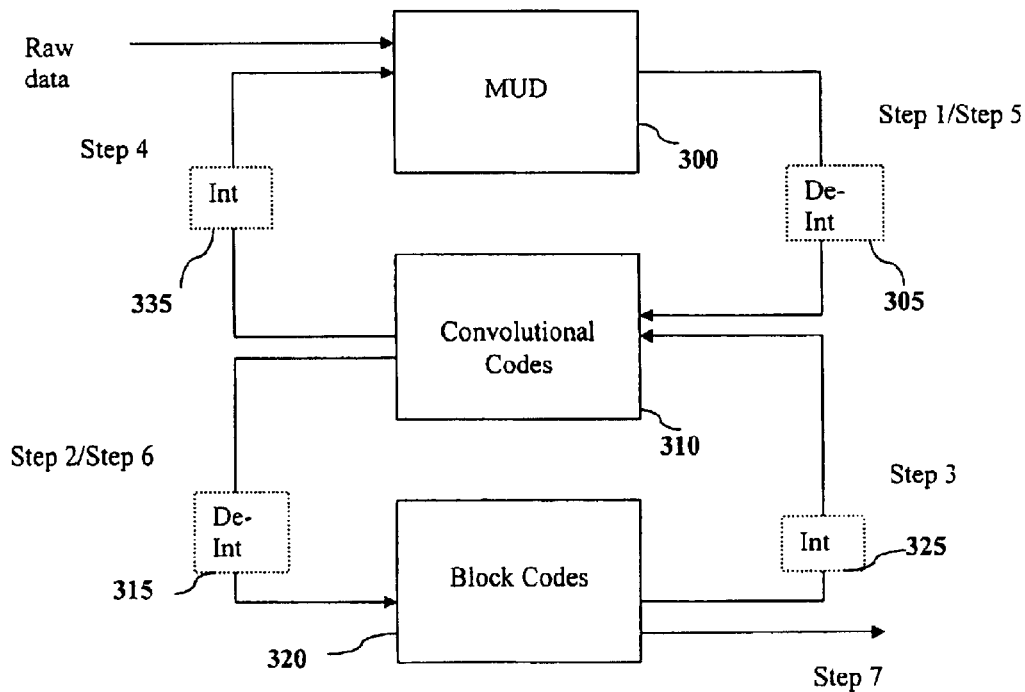
FIG. 3b illustrates the figure-eight process flow of the data through the decoding scheme of FIG. 3a, illustrating the flow through the MUD section, convolutional decoder and block decoder.

While developing the present invention, it was noted that forming two turbo loops, one between the MUD and convolutional decoders and one between the convolutional decoders and RS decoders, and coupling the two loops as illustrated in FIG. 3b improves performance when compared to the partitioned approach shown in FIG. 2a. The coupling of the turbo-loops is referred to as "chained turboMUD" or "multi-turboMUD" work as depicted in FIG. 3a and 3b.

There are a number of differences between the present approach and the code design approach of the double serially concatenated approach known in the art. The double serially concatenated is primarily concerned with code design for the component codes of double concatenated codes and performance bounds developed for the carefully designed component codes as an error correction code system. Another difference is that the present approach exploits the presence of an existing multiuser channel detector, along with two separately applied, and separately designed error correction codes to develop an overall joint detector and error correction receiver.

Referring again to FIG. 3a and 3b, the raw data after parameter estimation and optional filtering is input to the MUD detector 300. A filtering unit (not shown) can be incorporated prior to the MUD 300 in order to condition the data in better form for the MUD processing.

The MUD detector 300 passes soft decisions in the form of reliability, or confidence, measures to the single user decoders 310. Optional de-interleavers 305 are used for de-interleaving data. There is one reliability measure associated with each symbol of each user, and the convolutional decoders 310 calculate both conditional probabilities, one for each decoded symbol of each user, along with estimates of the decoded bits. Optional de-interleavers 315 possibly reorder the information, and then the estimated decoded bits are used by the bank of block decoders 320 to estimate values for the information bits and output them as confidence values. These confidence values are interleaved by interleaver 325, which matches the corresponding interleaver at the transmitter, if such an interleaver was used. The single user decoders 310 use these possibly reordered confidence values to update the conditional symbol probabilities. The conditional probabilities are then input back to the MUD algorithm 300 to determine new symbol estimates. If an interleaver was used in the transmitter, the conditional probabilities are reordered by interleaver 335 before being passed to MUD unit 300. The single user convolutional decoders 310 use the new symbol estimates from the MUD unit 300 or optional deinterleaver 315 to recalculate new bit estimates and the new bit estimates are then used by block decoder 320 to update the information sequence estimates.

The passing of information between the MUD 300, the convolutional decoders 310, and the block decoders 320 repeats in subsequent iterations until an asymptote is reached or the desired performance level is attained. At that point, estimates of the information sequences for all active users are output 350. If the block decoders 320 determine soft values, a soft-to-hard conversion unit 330 converts the soft data and hard-valued estimates are output 350.

Operation then commences for the next block of data, repeating the process described above. The MUD unit 300 can contain either a full-complexity MUD algorithm, or a reduced complexity MUD approach such as a MMSE MUD, tree-pruned MUD, or Q-algorithm MUD. When reduced-complexity MUD approaches are used, the iterative nature of the invention allows for significant reductions in complexity without affecting the performance. The bank of single-user decoders 310 can be any type of decoder, preferably a soft-output decoder such as BCJR or SOVA. The block decoding 320 can be any type of block decoder such as Reed-Solomon (RS). The innovation of the approach described herein is a result of the method in which the units interact, and is not restricted to a certain type of decoder placement. That is, the innovation described herein is a result of the processing flow with which the units interact. Furthermore, the approach can be used when other types of codes or combinations of codes are used, i.e. this approach is not restricted to the block-convolutional code-multiple access channel situation.

Thus, the process flows from the MUD 300 that make the original estimates for the data symbols to convolutional decoders 310 for the bits. These estimates by the convolutional decoders 310 are then passed to the block codes 320,such as Reed Solomon decoders, that can detect errors and make corrections based on what the information bit values should be as determined by the code book. The corrected data from the block code 320 is fed back into the convolutional decoders 310 that then pass corrected information to the MUD 300 for further processing.

FIG. 3b illustrates the figure-eight nature of the processing flow for the system shown in FIG. 3a. Referring to FIG. 3b the figure-eight processing is depicted as described herein. The steps of the flow are shown for one iteration (Steps 1 through 7). If more than one iteration is to be done, rather than the Step 7 shown, the figure-eight processing flow continues until all iterations are complete. The raw data is processed by the MUD 300 and de-interleaved as noted for Step 1. The MUD detector 300 passes soft decisions to the bank of convolutional decoders 310. The convolutional decoders 310 calculate conditional probabilities for each decoded symbol of each user, along with estimates of the decoded bits. The estimated decoded bits are then used by bank of block decoders 320 to calculate conditional probabilities for the decoded bits and estimates of the information bits. The convolutional decoders 310 then use these values to update the conditional symbol probabilities which are then input back to the MUD 300 to determine new symbol estimates that are passed back to the convolutional decoders 310. The convolutional decoders 310 use the new symbol estimates and recalculate bit estimates, and these bit estimates are used by the block decoders 320 to update the estimates. Optional interleavers 325, 325 and de-interleavers 305, 315 are used as necessary to match the transmitter operations, as discussed previously.

As described herein, the present invention applies the multi-turbo approach to a multiuser detector system having a multiuser detector and two error correction codes which can be matching codes or a mix of convolutional codes and block codes. The present invention is the first proposed multi-turbo approach that contains dissimilar components, such as one convolutional code, one block code and one component resembling a convolutional code caused by multi-user interference. It is also the first proposed multi-turbo approach for multiple access interference mitigation.

Figure 4:
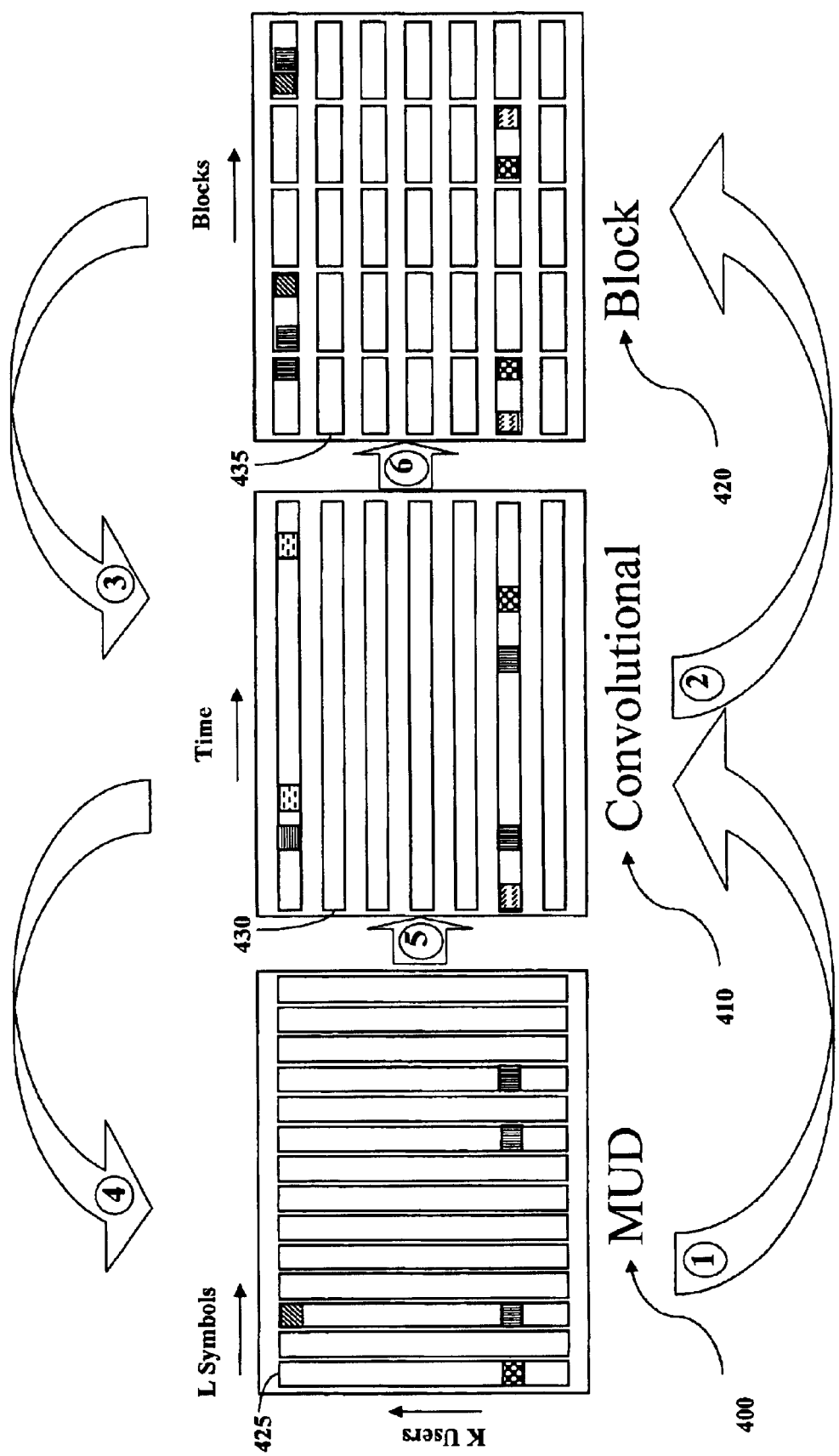
FIG. 4 is a graphical presentation of the propagation of estimate correction in multi-turboMUD and the bit processing through the MUD and decoder sections.

The rationale behind the feasibility of the multi-turboMUD approach of the present invention is graphically depicted in FIG. 4. It should be readily apparent that the presentation of a MUD stage 400—Convolutions stage 410—Block stage 420—is just one embodiment of the present invention. The decoders can be both convolutional decoders, both block decoders or a mix of convolutional and block decoders. As the middle decoder has the greatest number of processing iterations, the fastest processing may want to be deployed in this middle stage.

Consider a frame of data that enters the multi-turboMUD process, organized into a K×L block in which one column of data corresponds to symbols from all of the K users at a given symbol interval and one row corresponds to the symbols from one user over the frame time. The MUD 400 corrects symbol estimates column-by-column by exploiting the signal-space distance relationships between the K simultaneous users. Each single user decoder in the bank of convolutional decoders 410, such as BCJR, operates on a row of the block to correct the symbols for a particular user based on the constraints imposed by the convolutional encoder scheme. When iterating only between the MUD 400 and the convolutional decoder 410, the correction of a symbol in a column by the MUD 400 can later allow a correction of the symbols by the convolutional decoders 410 in other column positions within the same row as the previously corrected symbols. Expressed differently, the columns in the MUD 400 are coupled together by the convolutional decoders 410 row-wise relationships. Each single user block decoder 420 works on smaller portions of one row, using the block encoder relationship that was imposed at the transmitter. Each single user block decoder operates on the entire row under consideration, but the block code relation is restricted to bits that belong to the same, smaller blocks within the row, according to the size or rate of the block code. A correction in a small portion of the row can then propagate throughout the row during the next visit to the convolutional decoding process, and then affect the column-wise operations done in the MUD 400.

One multi-turbo iteration is considered in the following illustrative example based on FIG. 4. The bits used in FIG. 4 involve various bit correction stages as follows:

- First visit to a component - corrections made by current component
- Second visit to a component - previous corrections by previous components
- First visit to a component - corrections made by previous components
- Second visit to a component - current corrections by current component
- Third visit to a component - current corrections by current component
- Third visit to a component - previous corrections by previous components Referring to FIG. 4 the error correction relationships between the three component decoders, MUD 400, convolutional decoders 410 and the block decoders 420 is graphically represented. As depicted herein, the bits designating changes include first iteration changes made in previous components; first iteration corrections made in the current component; second iteration corrections made in previous components; and, second iteration corrections made in the current component.

The processing of the present invention decoding starts in the MUD 400. The MUD 400 examines the relationship between symbols and forms a matrix of columns of data 425 of for each of a number of K users by so many time intervals of L symbols. For the first iteration, the MUD 400 looks across all users in the column of data 425 at each time interval, and based on information and knowledge of relationship between the users, it corrects certain positions relative to estimates that are generated by conventional methods such as a matched filter. The MUD 400 also makes subsequent corrections based on the processing by the decoders 410, 420 so that the iterative processing produces better results.

In the convolutional decoder bank 410, there is one decoder for each user. In one embodiment, the BCJR decoder is implemented. The convolutional decoder 410 takes the data from the MUD 400 and uses one decoder for each user to look across the whole time frame for each user, which is depicted in rows 430. There are specific allowed sequences of symbols based on constraints of what can be sent by the convolutional codes, so the convolutional decoders 410 identifies errors and makes corrections based on these code constraints. The convolutional decoders 410 use the corrected bits from the MUD 400 and provide further corrections.

The block decoders 420,such as RS decoders, look at a number of symbols from a particular user, which are blocks of symbols 435 for a time period of a particular user. The units of symbols are self-contained blocks and not the entire string and do no effect the next block. All error correction decoders have specific sequences that define sequences of the bits. For example, there are standard block sets for RS decoders by burst error of length. Because the convolutional decoder 410 is able to make certain corrections, the block decoder 420 is able to make subsequent corrections.

Figure 5:
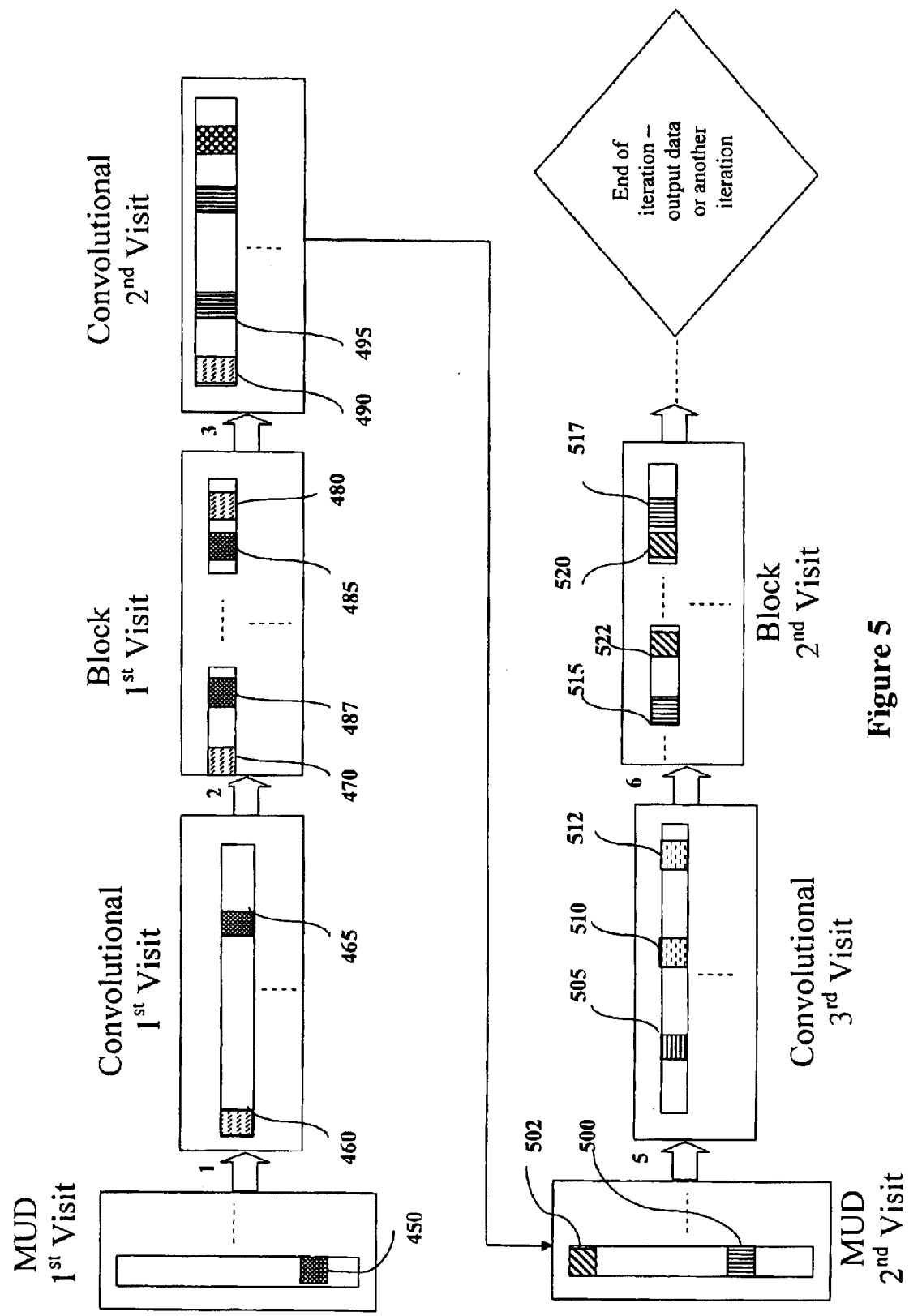
FIG. 5 is a more detailed perspective of the teachings of FIG. 4 showing the bit processing through the MUD and decoder sections for one iteration.

Referring to FIG. 4 and FIG. 5, in the first pass, the MUD 400 corrects a symbol in the first column 450 based on the relationship between the rest of the symbols from other users in the first column. This is a first iteration correction made by the, MUD, without the benefit of decoder correction, using the information from certain pre-processing employed that provides estimation information. The parameter estimation and filters (not shown) generate information about the data which is utilized by the MUD 400.

In Step 1, this data, typically soft decisions with one reliability measure associated with each symbol, is passed from the MUD 400 to the convolutional decoder 410. The convolutional decoder 410 uses the corrected symbols from the previous component, the MUD 400, to further improve the data by processing conditional probabilities for each decoded symbol of each user. For example, the corrected bit of the MUD 450 is a first visit corrected symbol from a previous component 460 and is used by the convolutional decoder 410 to make a correction in the same row for a given user by making a correction to a symbol 465, which is a first visit correction made by the convolutional decoder 410.

In Step 2, the corrected symbols from the convolutional decoders 410 are passed to the block decoders 420. The block decoder 420 examines a number of symbols from a particular user in a block 435 and makes further corrections employing the code design constraints to refine the symbol estimates. For example, the two corrected symbols 460, 465 from the convolutional decoder 410 are designated as corrections made in a previous component 470, 480 and aid the block decoder 420 in making two additional corrections, first visit correction 485 and 487.

The block decoder 420 generates estimate values for the information bits and output them as confidence values in step number three back to the convolutional decoder 410. The convolutional decoder uses these new estimate values to update the conditional symbol probabilities and further refine the estimates. In this example, when the convolutional decoder 410 is visited for the second time and re-processes the new information from block decoders 420, there are no changes that are made based on the row containing previous corrections.

In Step 4, the conditional probabilities from the convolutional decoder 410 are then used during the second visit to the MUD 400 to determine new symbol estimates. The information passed back to the MUD 400 contains the corrections from all components in the previous iterations to correct symbols in a column-wise fashion. In this example, previous correction 500 from the third column of FIG. 4 enables the MUD to produce current correction 502.

The third visit to convolutional decoder 410 and subsequent second visit to block decoder 420 operate as in the previous visits, but are now able to correct more errors based on the updated information.

As denoted by Step 5, the convolutional decoders 410 use the symbol estimates from the second visit of the MUD 400 and recalculate new bit estimates. In the displayed example, the previously corrected estimate 505 produces current changes 510 and 512 in the top row. Step 6 passes the refined data estimates for a second visit to the block decoder 420 to update the information sequence estimates. For example, current changes 520 and 522 and previous changes 515 and 517 are depicted from a portion of the top row in the block code depiction in FIG. 4.

For a one-iteration system, the last step passes the resulting decoded information bit estimates to the users. For multiple-iterations, the passing of information between the MUD 400, the convolutional decoders 410 and the block decoders 420 repeats in subsequent iterations until an asymptote is reached or the desired performance level is attained. At that point, estimates of the information sequences for all active users are output. If the block decoders determine soft values, a soft-to-hard conversion is done and hard-valued estimates are generated. Operation then commences for the next block of data, repeating the process as described herein.

In one example, the present invention takes an output of the convolutional decoder 410 and the initial estimate of bits, typically soft values from a BCJR which provides a numeric value, for example 0.8, instead of guessing '1'. The block decoders 420, typically RS decoders, use hard values, and possibly in combination with a soft to hard thresholder (not shown). The process of transforming the data using convolutional decoding, then block decoding and then re-coding it corrects certain values as described herein.

Figure 6A:
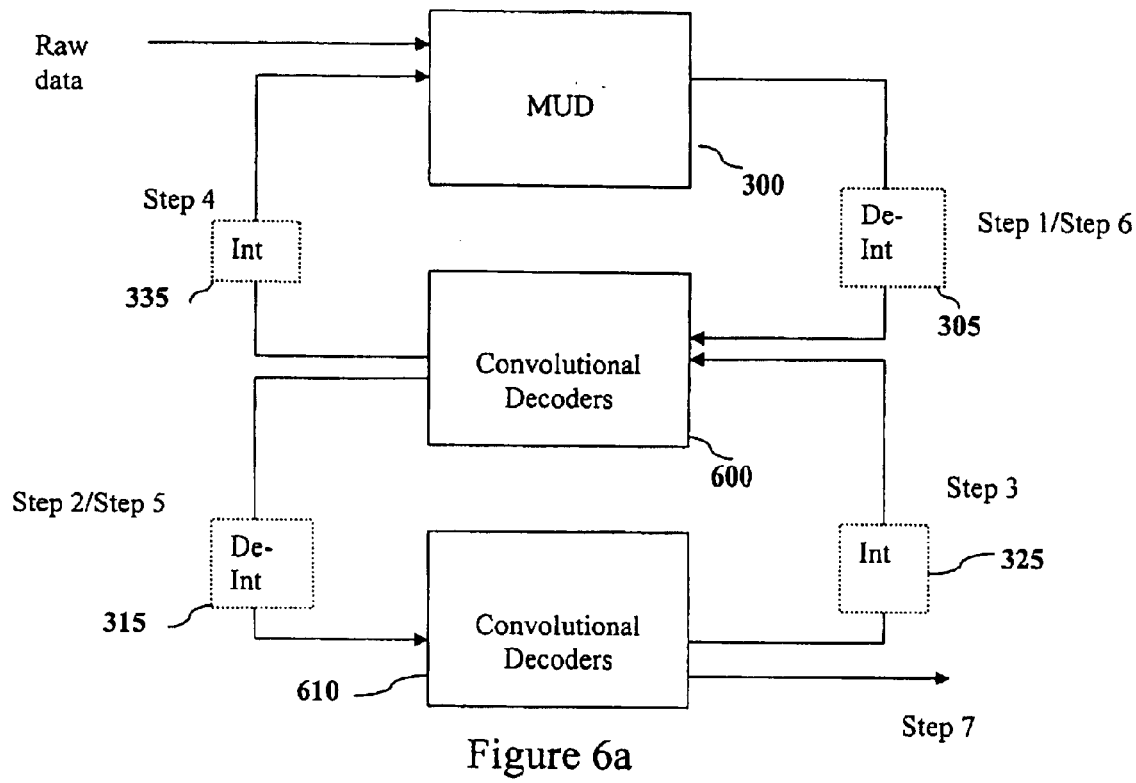
FIG. 6a shows the process flow of the decoding noted in FIG. 3b, with processing in MUD, convolutional decoder and convolutional decoder.

Referring to FIG. 6a the figure-eight processing is depicted as described herein, however in this example the decoders are a first bank of convolutional decoders 600 and a second bank of convolutional decoders 610. The flow is shown from one iteration (steps 1 through 7), and if more than one iteration is to be done, rather than the Step 7 shown, the figure-eight processing flow continues until all iterations are complete. The raw data is processed by the MUD 300 and de-interleaved as noted for step one. The MUD detector 300 passes soft decisions to the first convolutional decoders 600. The first convolutional decoders 600 calculate conditional probabilities for each decoded symbol of each user, along with estimates of the decoded bits. The estimated decoded bits are then used by second convolutional decoders 610 to calculate conditional probabilities for the decoded bits and estimates of the information bits. The first convolutional decoders 600 use these values to update the conditional symbol probabilities which are then input back to the MUD 300 to determine new symbol estimates that are passed to the first convolutional decoders 600. The first convolutional decoders 600 use the new symbol estimates and recalculate bit estimates, and these bit estimates are used by the second convolutional decoders 610 to update the estimates. Optional interleavers 325, 335 and de-interleavers 305, 315 are used as necessary to match the transmitter operations, as discussed previously.

Figure 6B:
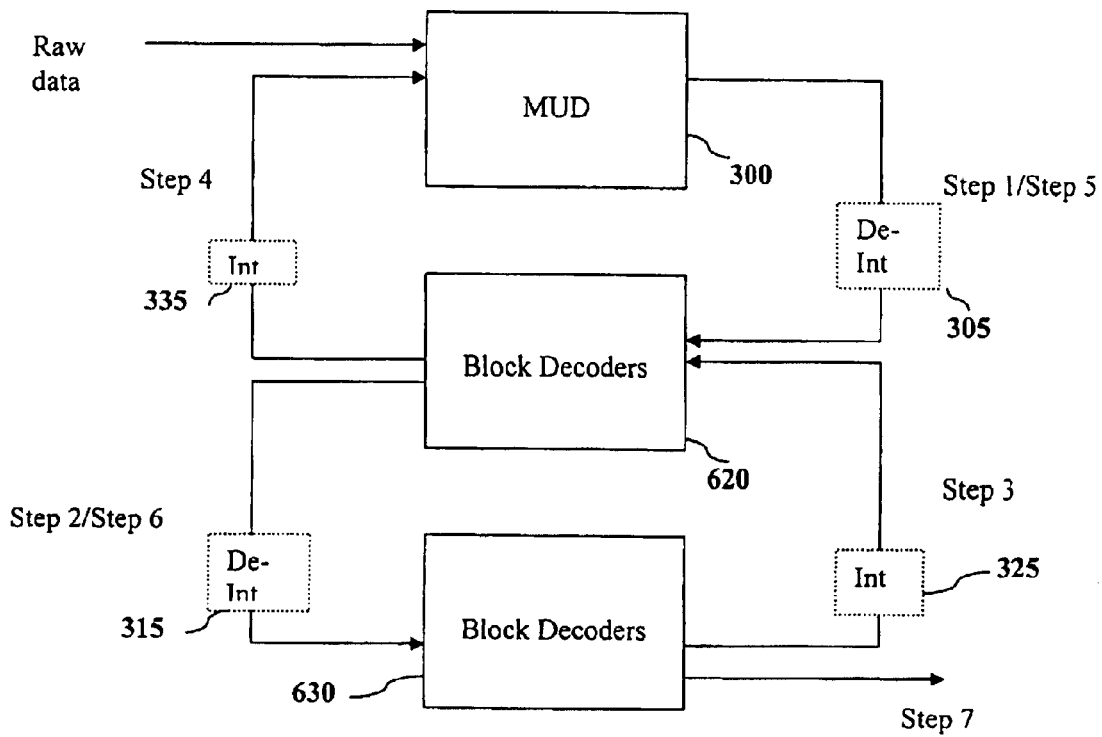
FIG. 6b shows the process flow of the decoding noted in FIG. 3b, with processing in MUD, block decoder and block decoder.

The embodiment in FIG. 6b shows the process flow of the figure-eight decoding noted in FIG. 3b with processing in MUD, first (inner) block decoder 620 and second (outer) block decoder 630. The raw data is processed by the MUD 300 which passes soft decisions to the first block decoders 620. The first block decoders 620 detect errors and make corrections based on expected values according to the code book. The first block decoders 620 generate estimate values for the decoded bits, and output them as confidence values to the second block decoders. The confidence values are used by second block decoders 630 to calculate estimate values for the information bits. The second block decoders 630 passes new estimates to the first block decoders 620, which uses these values to update the estimate values which are then input back to the MUD 300 to determine new symbol estimates. The processing for the current iteration then continues to the inner block decoder 620 and outer block decoder 630 as previously described. Again, optional interleavers and de-interleavers are implemented as necessary.

Figure 7:
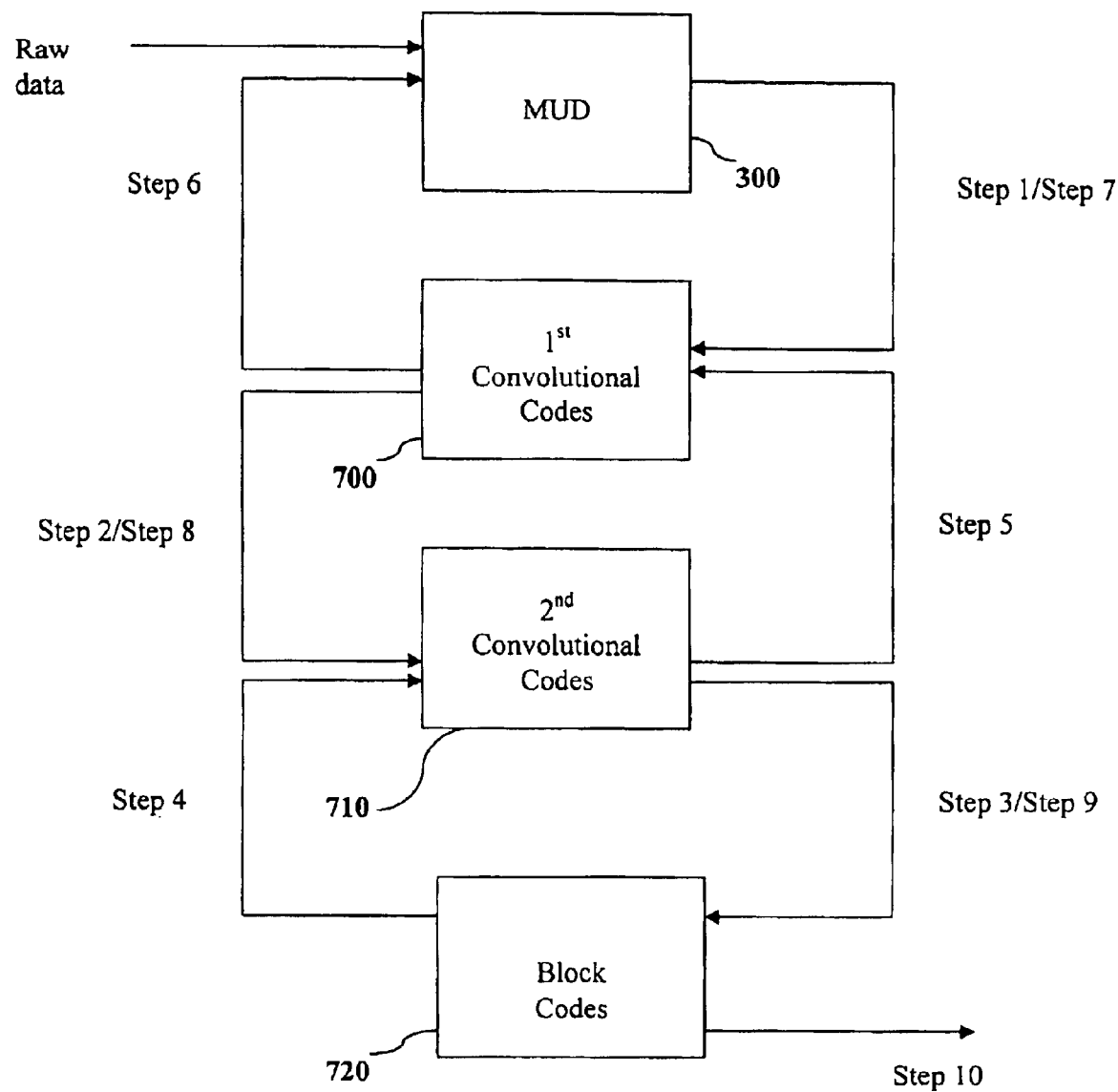
FIG. 7 illustrates the process flow of the decoding with multiple decoder stages operating in the figure-eight configuration.
Figure 6A:
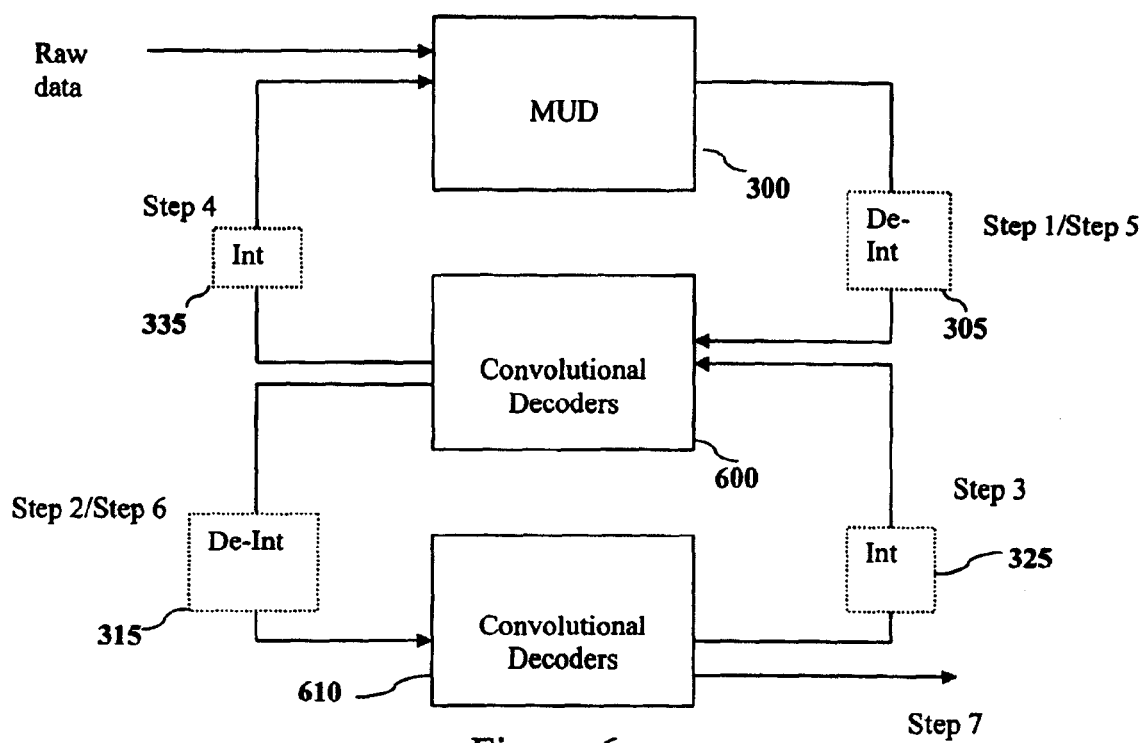
Figure 6B:
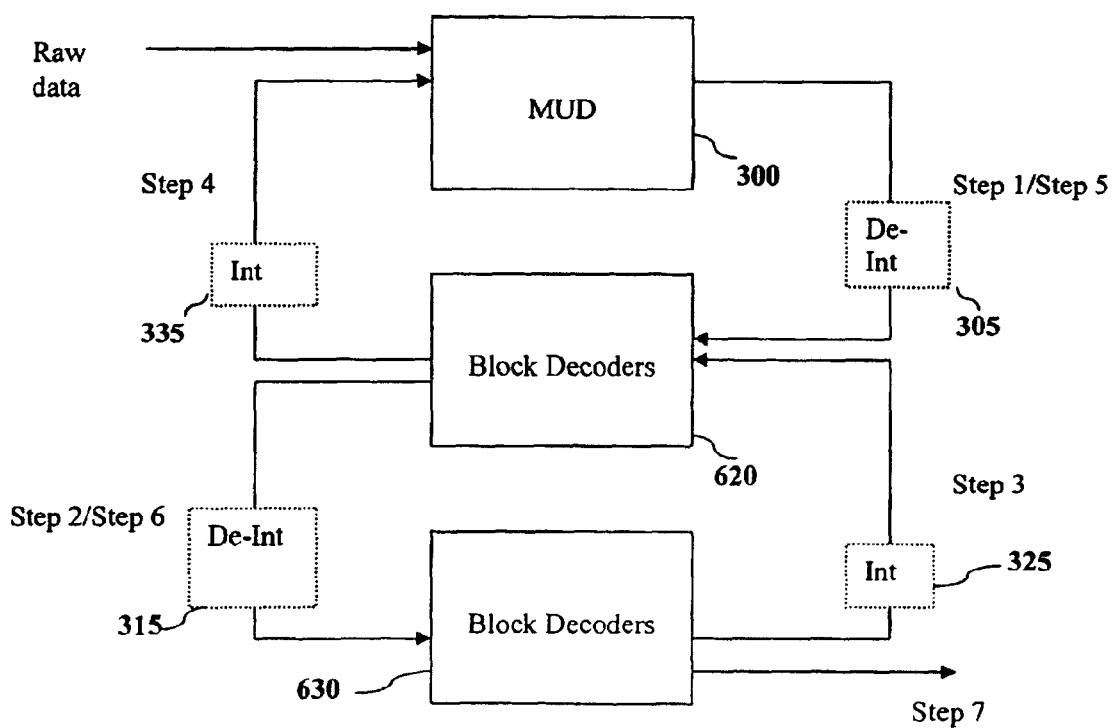

Referring to FIG. 7, an extension of the figure-eight processing employing multiple decoder stages is depicted. While this illustrates three decoder stages, it is within the scope of the present invention to encompass a multitude of decoder stages in any combination of block and convolutional decoders. As previously described, the data is input to the MUD 300 and a first set of soft decisions is passed to the first convolutional codes 700 shown as Step 1. The first convolutional codes 700 calculate conditional probabilities for each decoded symbol of each user, along with estimates of the decoded bits. The estimated decoded bits are then passed to the second convolutional codes 710 (Step 2) to calculate conditional probabilities for the decoded bits and estimates of the information bits. These decoded estimate bits are then passed to the block codes 720 (Step 3) which detect errors and make corrections based on expected values according to the code book. The block codes 720 generate estimate values for the decoded bits, and output them as confidence values to the second convolutional codes 710 (Step 4). The second convolutional codes calculate the updated conditional probabilities and updated estimates of the information bits. These values calculated by the second convolutional codes are then passed back to the first convolutional codes 700 (Step 5). The first convolutional codes 700 use these values to update the conditional symbol probabilities which are then input back to the MUD 300 (Step 6) to determine new symbol estimates that are passed to the first convolutional codes 700 (Step 7). The first convolutional codes 700 use the new symbol estimates and recalculate bit estimates, and these bit estimates are passed to the second convolutional codes 710 (Step 8) to update these estimates, which are then passed to the block codes 720 (Step 9). The flow is shown for one full iteration (steps 1 through 9) and the data can be output Step 10, or continue the iterative processing until a final condition is obtained. Any number of decoder stages and any combination of types of decoders used is within the present invention which can be tailored for a particular application.

Thus, the present invention comprises a multi-user detector serially concatenated to two or more decoder sections in such a manner that data flows iteratively from the MUD and to each decoder stage and back to the MUD to correct for errors. The decoders can be any type of decoder implemented with the MUD, including any type of block or convolutional modeled code. The decoders can be both block decoders, both convolutional decoders, or one block decoder and one convolutional decoder.

It is readily apparent that the multi TurboMUD decoding technique can be used in a variety of applications and with varied methods for implementing the system, and is therefore not limited to the embodiments presented herein. Diverse variations and modifications may be made without departing from the scope of the present invention. The methodology can be used to replace existing receivers without any modifications to the transmitter, thereby allowing service providers to offer improved performance without changing the signaling scheme. For example, cellular phones can operate with additional features and functionality added to the base station or tower.

Numerous characteristics and advantages have been set forth in the foregoing description, together with details of structures and functions, and the novel features thereof are pointed out in appended claims. The disclosure, however, is illustrative only, and changes may be made in arrangement and details, within the principle of the invention, to the full extent indicated by the broad general meaning of the terms in which the appended claims are expressed.

What is claimed is:

1. A multi-user detector processing system for multiple access communications channels, comprising:
    a multi-user detector coupled to a plurality of user signals, wherein said multi-user detector produces a first set of symbol estimates for each of said user signals;
    a first bank of decoders coupled to said symbol estimates producing a first decoded data stream; and
    a second bank of decoders coupled to said first bank of decoders processing said first decoded data stream and producing a second decoded data stream, wherein said second decoded data stream is passed back to said first bank of decoders for processing of a third decoded data stream, wherein said third decoded data stream is passed back to said multi-user detector for processing of a second set of symbol estimates for each of said user signals, and wherein said second set of symbol estimates is passed to said first bank of decoders to produce a fourth decoded data stream said fourth decoded data stream is passed to said second bank of decoders to produce a fifth decoded data stream.

2. The multi-user detector processing system according to claim 1, wherein said multi-user detector uses algorithms selected from at least one of the group consisting of: M-algorithm, T-algorithm, MT algorithm, Q-algorithm, and FANO algorithm.

3. The multi-user detector processing system according to claim 1, wherein said first bank of decoders are convolutional decoders and said second bank of decoders are block decoders.

4. The multi-user detector processing system according to claim 1, wherein said first bank of decoders are convolutional decoders and said second bank of decoders are convolutional decoders.

5. The multi-user detector processing system according to claim 1, wherein said first bank of decoders are block decoders and said second bank of decoders are block decoders.

6. The multi-user detector processing system according to claim 1, wherein said convolutional decoders are is selected from at least one of the group consisting of: maximum a posteriori (MAP) decoders, soft-output Viterbi algorithm (SOVA) decoders, and Bahl, Cocke, Jelinek, Raviv (BCJR) decoders.

7. The multi-user detector processing system according to claim 1, further comprising an interleaver and a de-interleaver coupled between said multi-user detector, said first bank of decoders and said second bank of decoders.

8. The multi-user detector processing system according to claim 1, further comprising a hard decision unit coupled to said low complexity bank of decoders processing said soft data stream producing a final data stream for each of said user signals.

9. The multi-user detector processing system according to claim 1, further comprising a filter unit coupled to said user signals and said multi-user detector.

10. The multi-user detector processing system according to claim 9, wherein said filter unit is selected from the group comprising: a whitening matched filter bank and a matched filter bank.

11. The multi-user detector processing system according to claim 1, further comprising iterative processing of said fifth decoded data stream by said first bank of decoders, said multi-user detector and said second bank of decoders until a final condition is obtained.

12. The multi-user detector processing system according to claim 11, wherein said fifth decoded data stream is output data.

13. The multi-user detector processing system according to claim 11, wherein said final condition is selected from the group consisting of: an allowable performance level and a fixed number of iterations.

14. A method for processing receiver signals from multiple users, said method comprising:
    estimating a set of symbols from said receiver signals for each of said users using a multi-user detector;
    decoding said set of symbols using a first decoder and producing a set of corrected first decoder values;
    decoding said first decoder values with a second decoder and producing a set of corrected second decoder values;
    decoding said set of corrected second decoder values using said first decoder and producing a set of re-corrected first decoder values;
    re-estimating said set of symbols using said multi-user detector;
    re-decoding said set of symbols using said first decoder and revising said set of corrected first decoder values; and
    re-decoding said first decoder values with said second decoder and revising said set of second decoder values.

15. The method for processing receiver signals according to claim 14, further comprising repeating said steps of re-estimating using said multi-user detector, re-decoding using said first decoder and re-decoding using said second decoder until a final state is obtained and outputting a final data stream for each user.

16. The method for processing receiver signals according to claim 14, wherein said final state is determined by setting a fixed number of iterations.

17. The method for processing receiver signals according to claim 14, wherein said final state is determined by setting an allowable performance level.

18. The method for processing receiver signals according to claim 14, further comprising performing parameter estimation of said receiver signals.

19. The method for processing receiver signals according to claim 14, further comprising de-interleaving and interleaving.

20. The method for processing receiver signals according to claim 14, further comprising filtering said receiver signals.

21. The method for processing receiver signals according to claim 14, further comprising decoding said corrected second decoder values with a third decoder and producing a set of corrected third decoder values; decoding said set of corrected third decoder values using said second decoder and revising said set of corrected second decoder values.

22. A Turbo Multi-User detector for processing a plurality of received signals, comprising:

- a parameter estimation unit coupled to said received signals;
- a multi-user detector coupled to said parameter estimation unit, wherein said multi-user detector provides a plurality of information streams, one stream corresponding to each of said received signals;
- a bank of convolutional decoders coupled to said plurality of information streams, wherein said convolutional decoders output a plurality of refined information streams; and
- a bank of block decoders coupled to said plurality of refined information streams, wherein said block decoders output a plurality of refined-improved information streams, said plurality of refined-improved information streams fed back to said bank of convolutional decoders output a plurality of further refined-improved information streams which is fed back to said multi-user detector.

23. The Turbo Multi-User detector according to claim 22, further comprising an iterative processing between said multi-user detector, said bank of convolutional decoders and said bank of block decoders until a final condition is reached and said bank of block decoders output a final plurality of symbol streams.

* * * * *

UNITED STATES PATENT AND TRADEMARK OFFICE
CERTIFICATE OF CORRECTION

PATENT NO.   : 6,831,574 B1
DATED        : December 14, 2004
INVENTOR(S)  : Diane G. Mills et al.

It is certified that error appears in the above-identified patent and that said Letters Patent is hereby corrected as shown below:

Delete drawing sheet 6 consisting of figures 6A and 6B, and substitute therefor drawing sheet 6 consisting of figures 6A & 6B, as shown on the attached sheet.

Column 24,
Line 25, delete "low complexity", insert -- second --.
Line 25, delete "soft", insert -- fifth decoded --.
Line 33, delete first and second instance of "a".
Line 45, delete "an".
Line 45, delete "a".

Column 25,
Lines 6 and 9, delete "14", insert -- 15 --.

Signed and Sealed this

Eighth Day of November, 2005

JON W. DUDAS
*Director of the United States Patent and Trademark Office*